Jan. 6, 1970 N. HAGOPIAN 3,487,838
PEA PODDING MACHINE

Filed May 19, 1967 3 Sheets-Sheet 1

INVENTOR.
Nathan Hagopian
BY
Webster & Webster
ATTYS.

Jan. 6, 1970    N. HAGOPIAN    3,487,838

PEA PODDING MACHINE

Filed May 19, 1967    3 Sheets-Sheet 3

United States Patent Office 3,487,838
Patented Jan. 6, 1970

3,487,838
PEA PODDING MACHINE
Nathan Hagopian, Fresno, Calif., assignor to Commercial Manufacturing & Supply Co., Fresno, Calif., a corporation of California
Filed May 19, 1967, Ser. No. 639,678
Int. Cl. A01f 12/42, 12/44
U.S. Cl. 130—30                    4 Claims

ABSTRACT OF THE DISCLOSURE

A machine for mechanically removing fresh peas from the pods; the machine including relatively rotatable members provided with adjacent but spaced, cooperating elements between which the pods are fed and which elements—by impact—cause the pods to dehisce and release the peas.

BACKGROUND OF THE INVENTION

This invention is directed to that class of power actuated, podding or shelling machines wherein the produce is fed by gravity through the machine between a cone-like body surrounded by a cone-like casing in adjacent but spaced, relatively rotatable relation, with one being driven; the pod-engaging elements being carried on the adjacent faces of said body and casing.

SUMMARY OF THE INVENTION

The present invention provides, as a major object, an improved, power actuated machine—of the type described—for mechanically removing fresh peas from their pods; the machine including novel means arranged to quickly and effectively break open the pods and dislodge the peas therefrom as the pods are fed through the machine, and which machine will then freely and gravitationally discharge the pods and the separated peas for subsequent handling.

The present invention provides, as another object, a machine for the purpose wherein the body and surrounding casing, which are relatively rotatable and carry the pod-engaging elements on adjacent faces, are arranged in a manner to permit of reltive adjustment to alter the normal spacing of such elements and as the size of the pods to be handled may necessitate for the most effective results.

The present invention provides, as an additional object, a casing for the machine which is constructed and mounted so that it may be readily opened and if necessary removed from the machine, whereby to afford access into the machine for cleaning, and to the podding elements for inspection, repair, or replacement, without having to dismantle said machine as a whole.

The present invention provides, as a further object, a pea podding machine which is designed for ease and economy of manufacture, and convenience of use.

The present invention provides, as a still further object, a practical, reliable, and durable pea podding machine and one which is exceedingly effective for the purpose for which it is designed.

DESCRIPTION OF THE PREFERRED EMBODIMENT

Figure 1:
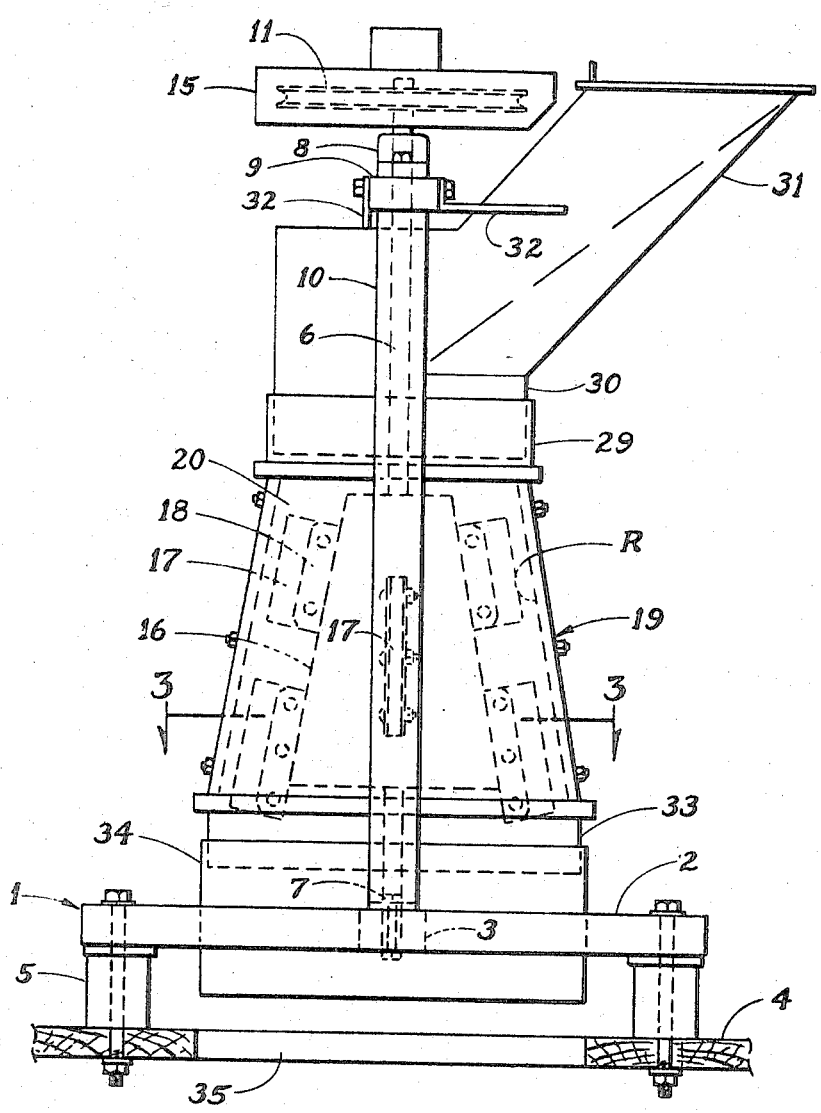
FIG. 1 is a side elevation of the improved pea podding machine.

Referring now more particularly to the drawings and to the characters of reference marked thereon, the machine comprises a suitable horizontal base indicated generally at 1, and from which the mechanical features of the machine are supported. The base 1 is preferably of H-form in plan, and consists of a pair of spaced parallel beams 2, connected by a centrally disposed cross beam 3. The base itself is fixed on, and in raised relation to, a suitable support 4 by means of short pedestals 5 at the ends of the beams 2, as shown in FIG. 1.

A vertical shaft 6 upstands from a lower bearing 7 mounted on the cross beam 3 centrally thereof. Adjacent its upper end, the shaft 6 is engaged in an upper bearing 8 mounted on an elevated cross beam 9 parallel to the cross beam 3 and supported at its ends by uprights 10 upstanding from the base beams 2 in line with said cross beam 3.

Figure 2:
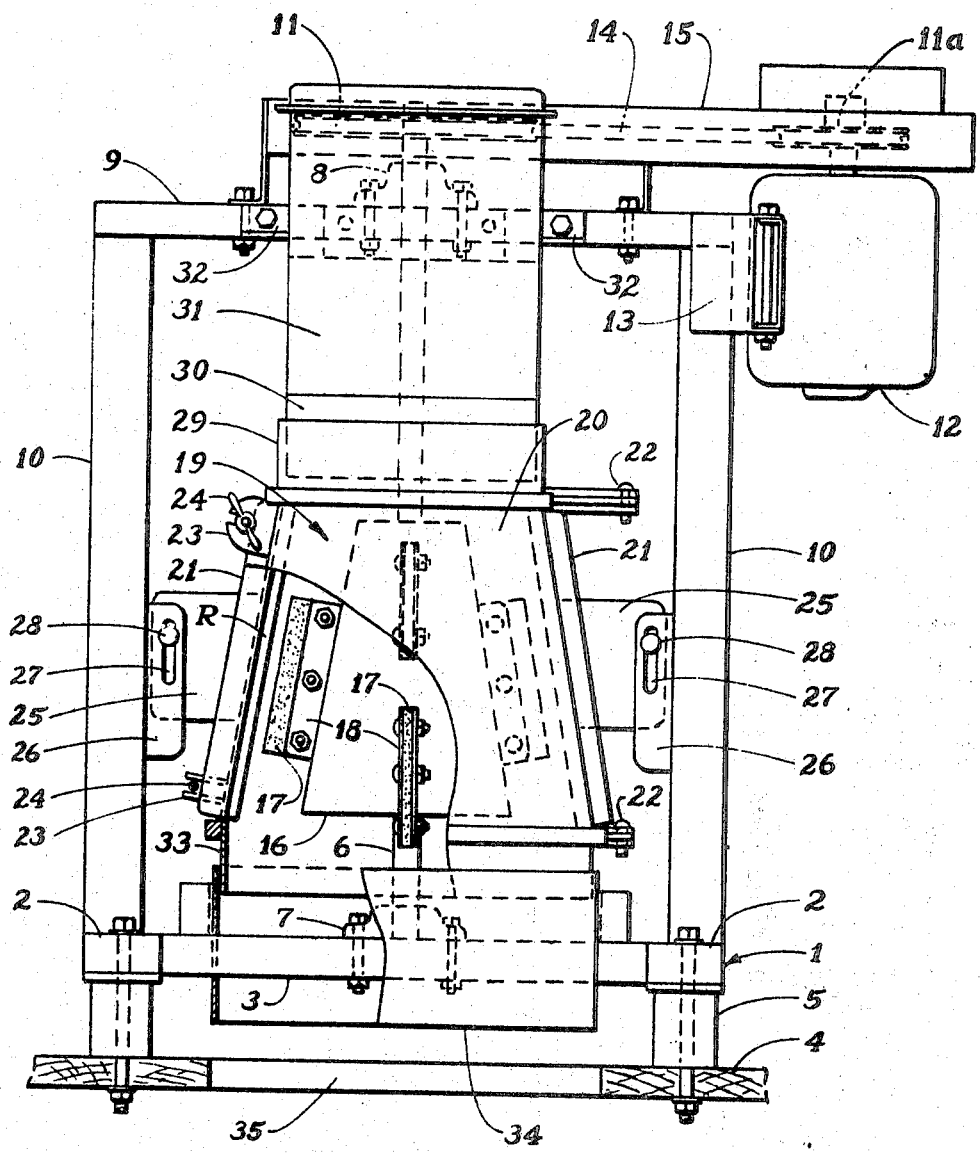
FIG. 2 is a front elevation of the machine, partly broken out.

Above the upper bearing 8, a V. pulley 11 is fixed on the shaft 6 in alinement with a variable-pitch pulley 11a mounted on the upstanding shaft of an electric motor 12. Such electric motor is supported on a suitable, preferably adjustable, mount 13 fixed in connection with one end of the beam 9 and the upper end of the adjacent upright 10. An endless belt 14 connects the pulleys 11 and 11a; the pulleys and belt being enclosed in a protective housing 15 supported from the beam 9 as shown in FIG. 2.

Fixed on the shaft 6 a short distance above the lower bearing 7 is an elongated, closed-face body 16, of frusto-conical upwardly tapering form, from which a plurality of circumferentially spaced and vertically staggered paddles 17 project radially outward; the outer edges of these paddles being parallel to the sidewall of the body. The paddles 17 are made of flexible rubber and are removably mounted between radial flanges 18 fixed on the body 16; the flanges 18 being considerably shorter radially than the paddles 17, so that the outer portions of the latter are free to flex.

Figure 3:
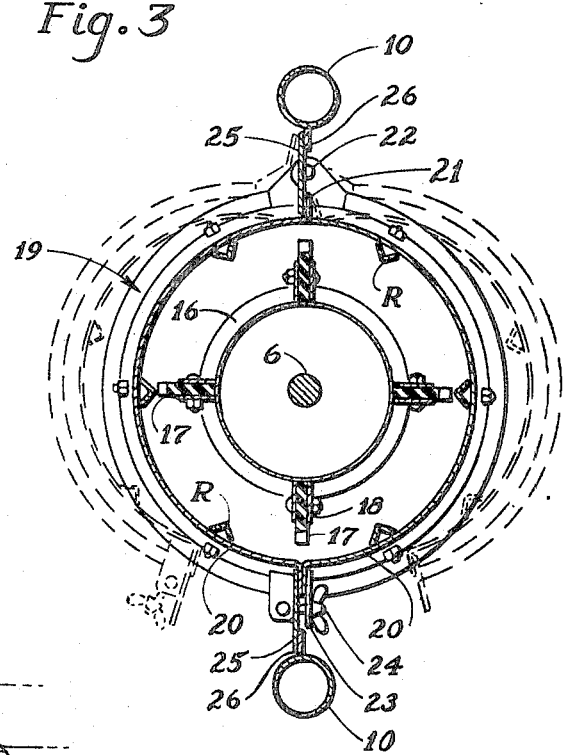
FIG. 3 is a sectional plan of the central portion of the machine, taken substantially on line 3—3 of FIG. 1.
Figure 4:
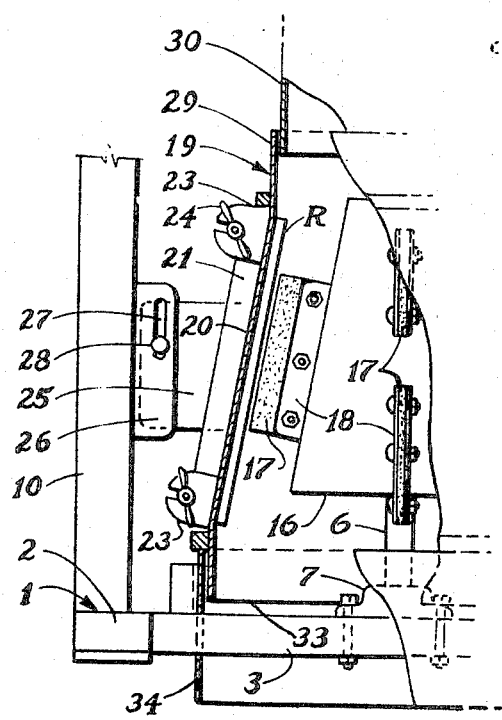
FIG. 4 is a fragmentary sectional elevation of the machine, showing the casing as adjusted downward to reduce the spacing between the podding paddles and the cooperating podding ribs of the machine.

Surrounding the body 16 in spaced but parallel relation is an outer frusto-conical casing 19; this casing having a vertical height somewhat greater than that of the body 16. The casing 19 comprises two identical halves 20 as clearly shown in FIG. 3; the line of separation of said halves 20 being in the vertical plane between the uprights 10, and said halves being provided along their adjacent edges with outwardly projecting, stiffening flanges 21. The casing halves 20 are connected on one side by vertically spaced hinges 22, the axes of which lie in a common vertical plane as shown in FIG. 2. The flanges 21 on the side of the casing opposite the hinges 22 are provided with top and bottom ears 23 which are releasably connected together by wing-nut bolts 24.

The casing 19 is provided on the inside with vertically elongated, circumferentially spaced V-shaped ribs R; said ribs being removably bolt-secured to the casing in the manner shown.

Vertical ears 25 project radially out from one of the flanges 21 on the opposite sides of the casing 19 toward the corresponding uprights 10, and vertically slidably engage against stop plates 26 fixed on and projecting from such uprights. The plates 26 are provided with vertical slots 27 which receive detachable clamping bolts 28 mounted in the ears 25. With the ears 25 normally clamped against the plates 26, the casing 19 is held in a selected position of vertical adjustment.

At the top the casing 19 includes an upwardly projecting diametrally split cylindrical sleeve 29 which slidably engages about a short cylindrical feed chute 30 included with and depending from a feed hopper 31. This hopper projects laterally away from the central plane of the machine and its supporting means, as shown in FIG. 1, and is disposed in a plane midway between the uprights 10, as shown in FIG. 2. The hopper is supported in a rigid position by suitable brackets 32 which are secured on the upper cross beam 9.

At the bottom the casing 19 includes a short downwardly projecting diametrally split cylindrical skirt 33 which slidably engages in a cylindrical discharge tube 34. Such discharge tube is supported from the base 1 and depends therethrough toward the support 4, which is provided with an opening 35 whereby material dropping through the tube 34 may be caught by a conveyor or the like (not shown) below said support. It should be here noted that the diameter of the upwardly projecting sleeve 29 is the same as that of the upper end of the casing 19, while the diameter of the downwardly projecting skirt 33 is the same as that of the lower end of said casing.

In operation, the pods—with the peas therein as picked on the vines—are fed into the hopper 31; the shaft 6 being driven at a suitable speed by the motor 12. The initially filled pods, after passing from the hopper and through the chute 30 and sleeve 29, deliver by gravity into the circular space between the rapidly rotating body 16 and the stationary casing 19 and are there engaged and broken open—as they pass therebetween—by the flexible paddles 17 and the ribs R. The peas are thus effectively released from the pods and, while remaining mixed therewith, then drop through the skirt 33 and discharge tube 34 and pass through opening 35.

If it should be found—after a run of pods through the machine—that the spacing between the paddles 17 and ribs R does not provide an efficient podding action for the particular size of the pods being handled, such spacing may be readily changed by loosening the clamping bolts 28 and shifting the casing 19 up or down before again tightening the bolts 28. Such changing of the spacing between the paddles 17 and ribs R occurs, of course, by reason of the taper form of the body 16 and the casing 19. With any such vertical adjustment of the casing 19, the sleeve 29 remains in contact with the chute 30, and the skirt 33 remains engaged with the discharge tube 34.

When it is desired to gain access into the machine, the clamping bolts 28 are removed, and the bolts 24 are disengaged from the ears 23. Then, upon lifting the casing 19 sufficient for the skirt 33 to clear the top of the discharge tube 34, the casing halves 20 may be opened about the hinges 22 as an axis, as indicated in dash lines in FIG. 3. The casing may then be removed from about the body 16, exposing the latter and the paddles thereon for cleaning and inspection, and replacement of any paddle if necessary. The removed casing may also, of course, be readily cleaned and inspected.

From the foregoing description, it will be readily seen that there has been produced such a pea podding machine as substantially fulfills the objects of the invention, as set forth herein.

While this specification sets forth in detail the present and preferred construction of the pea podding machine, still in practice such deviations from such detail may be resorted to as do not form a departure from the spirit of the invention, as defined by the appended claims.

I claim:

1. A pea podding machine comprising, with a supporting base, a vertical driven shaft mounted on and upstanding from the base, a plurality of flexible paddles mounted in fixed connection with and projecting radially from the shaft in circumferentially spaced relation thereto, a stationary casing surrounding the shaft in concentric relation and spaced outwardly from the paddles, a plurality of circumferentially spaced ribs projecting inwardly from the casing in spaced but substantially parallel and relatively closely cooperating relation to the paddles, the pods being engaged and broken open by the paddles and ribs, the casing being open at the top for feeding pods into the casing and open at the bottom for the discharge of the peas and pods therefrom, an upwardly projecting sleeve at the top of the casing, a feed chute slidably embraced by the sleeve, a downwardly projecting skirt at the bottom of the casing, and a discharge tube slidably embraced by the skirt; there being means to adjust the casing vertically, and the paddles and ribs being arranged so that such adjustment of the casing alters the adjustment between said paddles and ribs.

2. A pea podding machine comprising, with a supporting base, a vertical shaft mounted on and upstanding from the base, means driving the shaft at its upper end, an elongated upwardly tapering frusto-conical body fixed on the shaft intermediate its ends, a plurality of flexible paddles mounted on and projecting radially from the body, the outer edges of the paddles being substantially parallel to the sidewall of the body, a frusto-conical casing mounted in surrounding relation to the body and paddles substantially parallel thereto but space outwardly therefrom, a plurality of vertically elongated ribs projecting inwardly from the casing substantially parallel to but spaced outwardly from the paddles, a stationary hopper above and including a chute arranged to feed into the top of the casing, the pods being engaged and broken open by the paddles and ribs, the lower end of the casing being open for the discharge of pods and peas therefrom, radial ears projecting from opposite sides of the casing and disposed in a vertical plane, stop plates mounted in a fixed vertical plane and slidably engaging the ears, the plates having vertical slots therethrough, and clamping bolts mounted in the ears and projecting through the slots whereby the casing is normally, but adjustably, secured in a selected position of vertical adjustment.

3. A machine, as in claim 2, in which the casing is formed from diametrically separated halves, vertical axis hinges connecting the halves on one side, and means including releasable bolts connecting the halves on the opposite side.

4. A machine, as in claim 2, including an upwardly projecting sleeve at the top of the casing; said sleeve slidably embracing the hopper chute.

References Cited

UNITED STATES PATENTS

| 709,657 | 9/1902 | Aspinwall | 130—30 |
| 924,447 | 6/1909 | Freeman | 130—30 |
| 2,072,598 | 3/1937 | Kile | 130—30 |
| 2,321,461 | 6/1943 | Christel | 130—30 |
| 2,799,312 | 7/1957 | Ervin | 130—30 |

ANTONIO F. GUIDA, Primary Examiner